(12) United States Patent
Granero et al.

(10) Patent No.: US 11,087,255 B2
(45) Date of Patent: Aug. 10, 2021

(54) SYSTEM AND METHODS FOR FULFILLING AN ORDER BY DETERMINING AN OPTIMAL SET OF SOURCES AND RESOURCES

(71) Applicant: NETSUITE INC., San Mateo, CA (US)

(72) Inventors: Albert Margarit Granero, Barcelona (ES); Sergi Coll Povedano, Barcelona (ES); Tao Koïchi Serge Klerks, Barcelona (ES)

(73) Assignee: NETSUITE INC., San Mateo, CA (US)

(*) Notice: Subject to any disclaimer, the term of this patent is extended or adjusted under 35 U.S.C. 154(b) by 817 days.

(21) Appl. No.: 15/141,435

(22) Filed: Apr. 28, 2016

(65) Prior Publication Data

US 2017/0236083 A1   Aug. 17, 2017

Related U.S. Application Data

(60) Provisional application No. 62/154,561, filed on Apr. 29, 2015.

(51) Int. Cl.
| | |
|---|---|
| *G06Q 10/00* | (2012.01) |
| *G06Q 10/06* | (2012.01) |
| *G06Q 30/06* | (2012.01) |
| *G06Q 10/08* | (2012.01) |
| *G06Q 50/28* | (2012.01) |
| *G06Q 30/00* | (2012.01) |
| *G06Q 30/02* | (2012.01) |

(52) U.S. Cl.
CPC ..... *G06Q 10/06315* (2013.01); *G06Q 10/063* (2013.01); *G06Q 10/08* (2013.01); *G06Q 10/087* (2013.01); *G06Q 30/00* (2013.01); *G06Q 30/06* (2013.01); *G06Q 30/0635* (2013.01); *G06Q 50/28* (2013.01); *G06Q 30/02* (2013.01)

(58) Field of Classification Search
CPC .......... G06Q 10/06315; G06Q 10/087; G06Q 50/28; G06Q 30/0635
USPC ...................................................... 705/7.25
See application file for complete search history.

(56) References Cited

U.S. PATENT DOCUMENTS

| | | | |
|---|---|---|---|
| 7,263,495 B2 * | 8/2007 | Rodriguez | ....... G06Q 10/06315 705/7.26 |
| 7,295,990 B1 | 11/2007 | Braumoeller et al. | |
| 7,747,543 B1 | 6/2010 | Braumoeller et al. | |
| 7,860,750 B2 | 12/2010 | Hunter et al. | |
| 8,005,761 B1 | 8/2011 | Braumoeller et al. | |

(Continued)

*Primary Examiner* — Hafiz A Kassim
*Assistant Examiner* — Tyrone E Singletary
(74) *Attorney, Agent, or Firm* — Kraguljac Law Group, LLC

(57) ABSTRACT

Embodiments of the invention operate to determine an optimal or more optimal way in which an order for multiple items or services is fulfilled by an organization. This is performed by considering the possible combinations or permutations of order elements, costs, warehouse locations and inventory levels, delivery channels, etc. in a specified manner or order of operations. The resulting fulfillment schedule may involve a reduction or minimization in the cost, delivery time, number of shipments, distance of pick-up from customer, or another characteristic of importance to either a vendor or to a customer.

9 Claims, 6 Drawing Sheets

(56) References Cited

U.S. PATENT DOCUMENTS

| | | | |
|---|---|---|---|
| 8,352,382 B1* | 1/2013 | Katta | G06Q 10/087 |
| | | | 705/330 |
| 2003/0093388 A1* | 5/2003 | Albright | G06Q 30/0283 |
| | | | 705/400 |
| 2007/0226052 A1* | 9/2007 | Abbott | G06Q 30/0207 |
| | | | 705/14.1 |
| 2007/0244765 A1 | 10/2007 | Hunter et al. | |
| 2010/0262521 A1* | 10/2010 | Robinson | G06Q 10/08 |
| | | | 705/29 |

* cited by examiner

400

SYSTEM AND METHODS FOR FULFILLING AN ORDER BY DETERMINING AN OPTIMAL SET OF SOURCES AND RESOURCES

CROSS REFERENCE TO RELATED APPLICATION

This application claims the benefit of U.S. Provisional Application No. 62/154,561, entitled "System and Method to Determine the Optimal Set of Order Fulfillment Sources and Resources for an Order," filed Apr. 29, 2015, which is incorporated by reference herein in its entirety (including the appendix) for all purposes.

BACKGROUND

Embodiments of the inventive system and methods are directed to providing a way to relatively quickly and efficiently determine the optimal combination of sources and/or resources to use in fulfilling an order from a large set of possible permutations of those sources and resources. In some embodiments, the inventive methods may be implemented as part of an eCommerce platform that is used in conjunction with ERP and/or CRM data as part of a multi-tenant system for providing order management and order processing services (and further, may be implemented as a web-based or cloud-computing system).

To optimize warehousing costs, shipping costs and delivery time, retailers often fulfill/ship products for a single order from different warehouses and/or retail stores. Larger volume retailers may have dozens of warehouses and retail stores that potentially can ship products. This means that the possible number of permutations of fulfillment sources for any given order with multiple products can quickly become extremely large (e.g., hundreds, thousands, or millions of possible solutions), and thus consideration of all of the possible solutions is inefficient for use in determining an optimal solution.

Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for determining an optimal or more optimal way in which an order for multiple items or services is fulfilled by an organization. This is performed by considering the possible combinations or permutations of order elements, costs, warehouse locations and inventory levels, delivery channels, etc. in a specified manner or order of operations. The resulting fulfillment schedule may involve a reduction or minimization in the cost, delivery time, number of shipments, distance of pick-up from customer, or another characteristic of importance to either a vendor or to a customer.

To optimize warehousing cost, shipping costs and delivery time, retailers often fulfill/ship products for a single order from different warehouses and/or retail stores. As noted, larger retailers may have dozens of warehouses and retail stores that potentially can ship products. This means that the number of possible permutations of sources for an order containing multiple products or services can very quickly become extremely large (e.g., hundreds, thousands, or millions of possible solutions), making it inefficient to apply a complex optimization or decision process to each of the multiple possible choices.

As an example, for a retailer or supplier having an order to fulfill that contains 50 products with 50 possible fulfillment sources, there are $8.8178*10^{84}$ possible permutations, where the total number of permutations is based on the formula: where n is the number of fulfillment sources and r is the number of products. This is clearly a potentially overwhelming number of possibilities to consider in an efficient manner using conventional optimization methods.

Retailers that process thousands of orders per day need to be able to determine the optimal permutation of fulfillment sources quickly in order to properly allocate fulfillment resources, and may need to consider the candidate permutations based on multi-dimensional preferences of the merchant (for example, distance of fulfillment source to shipping address, region, shipping cost, opening hours, etc.). The inventive system and methods provide a solution to this problem by (among other aspects) applying a mathematical elimination algorithm to prune a search tree representing the options, and to discard less useful or sub-optimal combinations or options.

In some embodiments, the invention is directed to a method of fulfilling an order for a plurality of items, where the method includes:

accessing data representing the order, the accessed data including information sufficient to determine either zero, one, or more than one source from which each of the plurality of items may currently be obtained;

for each of the plurality of items for which one, or more than one, source may provide the item, determining an assignment of each of the plurality of items to a source for purposes of fulfillment, wherein determining the assignment further comprises representing the availability of each of the plurality of items in relation to a specific source as a binary number, wherein a first value of the number indicates that the item is available from that source and a second value indicates that the item is not available from that source;

determining a cardinality value for each of the one or more sources;

determining a maximum number of the plurality of items that can be fulfilled by the sources;

determining a minimum number of sources required to fulfill the maximum number of the plurality of items that can be fulfilled by the sources;

determining one or more combinations of sources that satisfy the minimum number of sources required to fulfill the maximum number of the plurality of items that can be fulfilled by the sources;

if more than one combination of sources is determined to satisfy the minimum number of sources required to fulfill the maximum number of the plurality of items that can be fulfilled by the sources, then applying one or more preference criteria to determine one combination of sources to use for fulfilling the order;

if desired, for each source in the determined one combination of sources, assigning each item to a specific source and each source to one or more specific items; and executing the fulfillment process using the assigned sources and their associated item or items.

In some embodiments, the invention is directed to an apparatus for fulfilling an order for a plurality of items, where the apparatus includes:

a database or data store containing a plurality of records, the plurality of records including records corresponding to the order;

a processor programmed with a set of instructions, wherein when executed by the processor, the instructions cause the apparatus to access the data records representing the order, the accessed data including information sufficient to determine either zero, one, or more than one source from which each of the plurality of items may currently be obtained;

for each of the plurality of items for which one, or more than one, source may provide the item, determine an assignment of each of the plurality of items to a source for purposes of fulfillment, wherein determining the assignment further comprises represent the availability of each of the plurality of items in relation to a specific source as a binary number, wherein a first value of the number indicates that the item is available from that source and a second value indicates that the item is not available from that source;

determine a cardinality value for each of the one or more sources;

determine a maximum number of the plurality of items that can be fulfilled by the sources;

determine a minimum number of sources required to fulfill the maximum number of the plurality of items that can be fulfilled by the sources;

determine one or more combinations of sources that satisfy the minimum number of sources required to fulfill the maximum number of the plurality of items that can be fulfilled by the sources;

if more than one combination of sources is determined to satisfy the minimum number of sources required to fulfill the maximum number of the plurality of items that can be fulfilled by the sources, then apply one or more preference criteria to determine one combination of sources to use for fulfilling the order;

if desired, for each source in the determined one combination of sources, assign each item to a specific source and each source to one or more specific items; and execute the fulfillment process using the assigned sources and their associated item or items.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 4($b$) is a diagram illustrating a process, method, operation, or function for determining an optimal set of sources and/or resources to utilize in fulfilling an order, and that may be used when implementing an embodiment of the invention.

Note that the same numbers are used throughout the disclosure and figures to reference like components and features.

DETAILED DESCRIPTION

Figure 1:
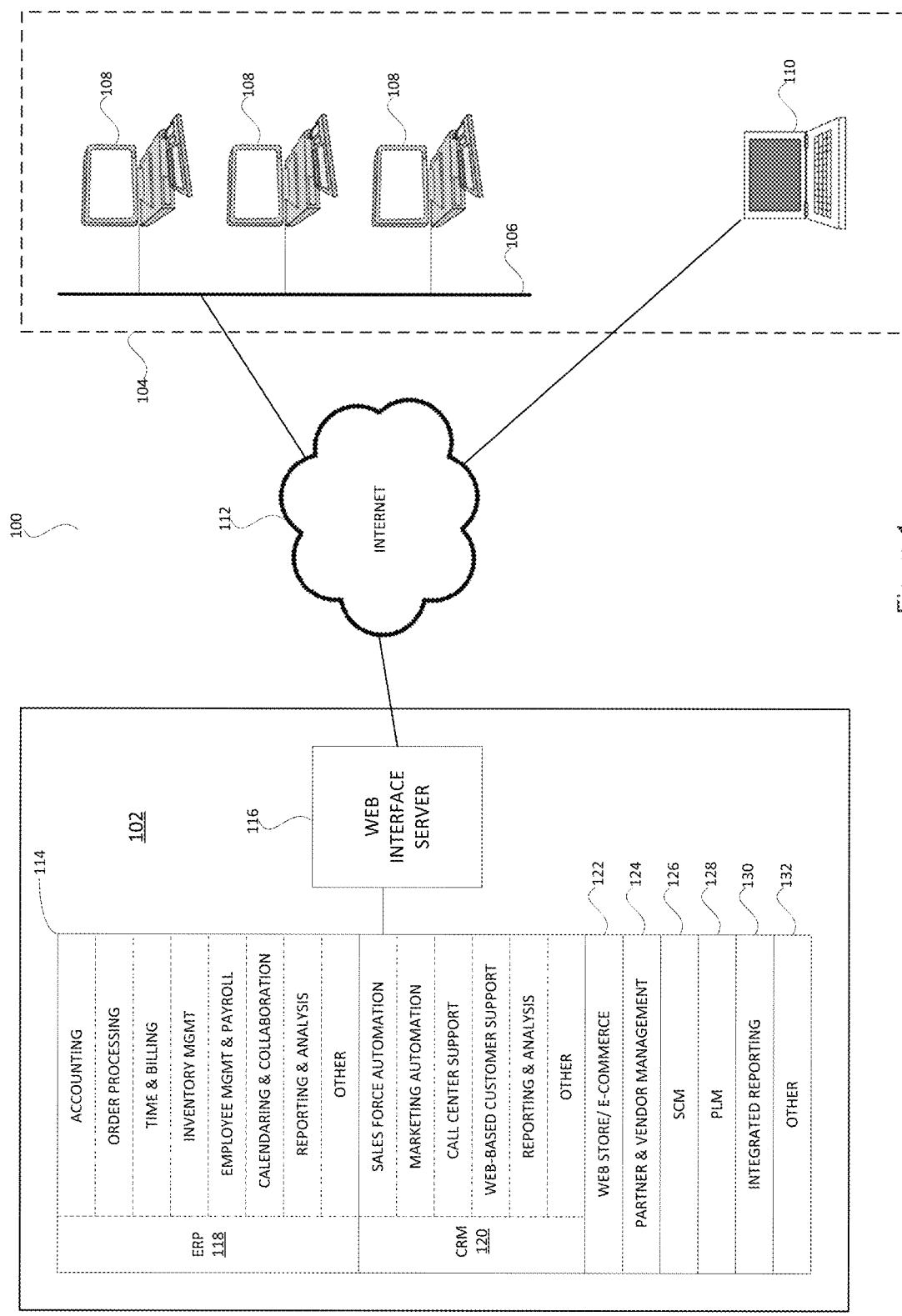
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented in whole or in part by one or more suitable processing elements (such as a processor, microprocessor, CPU, controller, etc.) that is part of an apparatus, client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention are directed to systems, apparatuses, and methods for optimizing the way in which an order or multiple orders are fulfilled by considering the possible combinations or permutations of order elements, costs, warehouse locations and inventory levels, delivery channels, etc. This may involve a reduction or minimization of one or more of cost, delivery time, number of shipments, distance of pick-up from customer, etc. (i.e., the suggested optimal source and/or resource allocation may be based on optimization of one or more variables or factors).

Note that in some embodiments, the inventive system and methods may be used to determine an optimal set of fulfillment sources (e.g., warehouses, storage sites, locations of physical items) and also a corresponding set of optimal fulfillment resources (e.g., transport methods, transport paths, temporary storage facilities, etc.) for use in fulfilling an order. This enables embodiments to determine a desirable set of sources for items in an order, as well as the infrastructure elements best suited to utilize in fulfilling the order.

In some embodiments, this aspect may be implemented by assigning a weight or cost measure to one or more of the infrastructure elements, and taking that into account when applying a preference criterion to enable a decision between two or more substantially equivalent options (as will be discussed with reference to FIG. 4(a)). In other embodiments, such a cost or weight may be taken into account as part of optimizing the search process that is implemented by the invention to determine the possible combinations of sources that may be used to fulfill an order. The relative weights assigned to various resources may be used to indicate a respective preference for their utilization based on cost, distance from a final destination, availability, scheduling, or the underlying operational parameters of a vendor's business (e.g., based on thresholds or triggers activated in response to specific business states or conditions, as those are reflected by ERP, CRM, eCommerce, or financial data).

Implementation of an Example Embodiment of the Inventive System and Methods

The following example describes the process of finding the optimal combination(s) of fulfillment sources for an order requesting five products:

| Line Number | Product |
|---|---|
| 1 | A |
| 2 | B |
| 3 | C |
| 4 | D |
| 5 | F |

In this example, there are five fulfillment sources that can fulfill these products. However, some of them might not be able to fulfill some items at a given time due to constraints, such as lack of available inventory, restrictions on opening hours, priorities, etc. The theoretical number of permutations of fulfillment sources for this order can be calculated as:

$$\mathcal{P} = n^r = 5^5 = 3{,}125$$

The matrix below identifies which fulfillment source is, in fact, able to fulfill each product (based on current knowledge of inventory at certain sites, delivery manifests, etc.):

| Line Number | Product | $FS_1$ | $FS_2$ | $FS_3$ | $FS_4$ | $FS_5$ |
|---|---|---|---|---|---|---|
| 1 | A | ✓ | ✓ | ✓ | ✓ | ✓ |
| 2 | B | | | | | |
| 3 | C | | | ✓ | | ✓ |
| 4 | D | | | | ✓ | ✓ |
| 5 | F | ✓ | | ✓ | | |

Note that based on this information:
- no single fulfillment source is able to provide each of the five products;
- product B is not available from any of the five sources; and
- product A is available from any of the sources.

This means that considering only the five sources noted, at a minimum, at least two (and possibly more than two) fulfillment sources must be used to provide products A, C, D, and F. Note also that while the relatively simple example being discussed may be analyzed using a trial and error process, as the number of products and/or fulfillment sources or resources increases, it becomes impractical and computationally inefficient to automate a trial and error process that considers all options. Therefore, another, more computationally efficient and practical approach is needed.

In some embodiments, the inventive process includes application of an algorithmic process that converts the information about products and fulfillment sources into binary representations. The coverage of each fulfillment source across multiple products is represented by a binary number, where each bit position represents a product and the bit value indicates the availability of an item or service at a particular source (i.e., available or not available).

The table below represents the result of transforming the data of the previous example:

| Fulfillment Source | A | B | C | D | F | Cardinality |
|---|---|---|---|---|---|---|
| $FS_1$ | 1 | 0 | 0 | 0 | 1 | 2 |
| $FS_2$ | 1 | 0 | 0 | 0 | 0 | 1 |
| $FS_3$ | 1 | 0 | 1 | 0 | 1 | 3 |
| $FS_4$ | 1 | 0 | 0 | 1 | 0 | 2 |
| $FS_5$ | 1 | 0 | 1 | 1 | 0 | 3 |

In one embodiment, the inventive process then determines one or more combinations of the minimum number of fulfillment sources that fulfill all of the products, using the following three steps/stages:

1. Determine the Maximum Number of Products That Can Be Fulfilled

In the first step, the process determines the maximum number of products that can be fulfilled with the current state of the fulfillment sources ($P_{fulfillable}$). To calculate that number, an embodiment of the inventive method performs a "bitwise OR" operation among all the binary representations and then determines the cardinality of the result:

$$P_{fulfillable}=\text{Cardinality}(FS_1|FS_2|FS_3|FS_4|FS_5)$$

Example:

| Fulfillment Source | A | B | C | D | F |
|---|---|---|---|---|---|
| FS$_1$ | 1 | 0 | 0 | 0 | 1 |
| FS$_2$ | 1 | 0 | 0 | 0 | 0 |
| FS$_3$ | 1 | 0 | 1 | 0 | 0 |
| FS$_4$ | 1 | 0 | 0 | 1 | 0 |
| FS$_5$ | 1 | 0 | 1 | 1 | 0 |
| (FS$_1$ | FS$_2$ | FS$_3$ | FS$_4$ | FS$_5$) | 1 | 0 | 1 | 1 | 1 (Cardinality = 4) |

In this example (and therefore based on the limited number of products and resources noted), the resultant binary number is 10111 and its cardinality is 4. That means that there is no combination available that could fulfill all 5 products and the best case scenario will only fulfill 4 of the 5 products.

2. Estimate the Minimum Number of Fulfillment Sources Required to Fulfill as Many Products as Possible In this step, one or more embodiments of the inventive process try to quickly (in a relative or computational sense) obtain a possible combination that can fulfill all (or the maximum number of) of the products. This possible optimal combination will be used in further steps of the invention to prune the combinatorial search space and thereby avoid the computing "costs" for combinations that can be relatively easily predicted or identified as suboptimal. However, note that the total number of Fulfillment Sources used in this "possibly optimal" combination (referred to as $S_{target}$) may not be the absolute minimum possible number of sources (referred to as $S_{minimum}$), as combinations having a lower number of Fulfillment Sources may be found during the search process. In order to obtain this possibly-optimal combination, the process picks the first fulfillment source with the highest cardinality. In the present example, FS$_3$ has the highest cardinality, with a value of 3. Next, the inventive process determines the cardinality of the combinations of all other fulfillment sources with FS$_3$ and chooses the combination having the highest cardinality value.

Example:

| Combination of Fulfillment Sources | A | B | C | D | F | Cardinality |
|---|---|---|---|---|---|---|
| F$S_3$ | FS$_1$ | 1 | 0 | 1 | 0 | 1 | 3 |
| F$S_3$ | FS$_2$ | 1 | 0 | 1 | 0 | 1 | 3 |
| F$S_3$ | FS$_4$ | 1 | 0 | 1 | 1 | 1 | 4 |
| F$S_3$ | FS$_5$ | 1 | 0 | 1 | 1 | 1 | 4 |

If the highest cardinality of all of the combinations is less than P$_{fulfillable}$, then the method iterates by combining another fulfillment source and continues until it reaches a combination having a cardinality that is equal to P$_{fulfillable}$. In the example, the combination of FS$_3$ with FS$_4$ has a cardinality of 4, equal to P$_{fulfillable}$. Therefore, the method determines that combining 2 fulfillment sources will allow the maximum number of products to be fulfilled, and it can prune all combinations of more than 2 fulfillment sources from the "search tree". Thus, $S_{target}=2$, where the minimum number of fulfillment sources required to fulfill P$_{fulfillable}$ products is $S_{target}$ as determined from this approach.

3. Determine all Possible Combinations with the Minimum Number of Fulfillment Sources In this step, one or more embodiments of the inventive process determine all possible combinations with the $S_{minimum}$ fulfillment sources that can fulfill P$_{fulfillable}$ products. In one embodiment, the process or algorithm "navigates" through the combinatorial search space of fulfillment sources until it obtains all of the possible sets with $S_{minimum}$ fulfillment sources. In some embodiments, in order to optimize the search process or tree of possible combinations, the algorithm may take as a base value $S_{target}$ and use that value as a reference point for discarding combinations that require a higher number of fulfillment sources. However, note that $S_{target}$ may be reduced during the execution of the combinatorial search, since the algorithm may find combinations that can fulfill P$_{fulfillable}$ products with a lower number of fulfillment sources than the initially selected value of $S_{target}$. In that case, $S_{target}$ will be reduced and therefore, the algorithm will discard any previously-identified combination(s) that requires a greater number of fulfillment sources than the updated value of $S_{target}$. At the end of the combinatorial search process or phase, the resulting $S_{target}$ value will become the value for $S_{minimum}$; this is because it is guaranteed that there are no possible combinations with a lower number of fulfillment sources than the final value of $S_{target}$.

Note that as part of this search phase, the following optimizations in the combinatorial search space may be applied; these are rules or heuristics that operate to prune the search tree:

a) Determine a promising (or the most promising) fulfillment source as the starting point for the combinatorial search; this permits finding the optimal sets more readily;

Example:

The process first sorts the set of fulfillment sources based on cardinality values. The most promising fulfillment sources (those with higher cardinalities) are evaluated first.

| Fulfillment Source | A | B | C | D | F | Cardinality |
|---|---|---|---|---|---|---|
| FS$_3$ | 1 | 0 | 1 | 0 | 1 | 3 |
| FS$_5$ | 1 | 0 | 1 | 1 | 0 | 3 |
| FS$_1$ | 1 | 0 | 0 | 0 | 1 | 2 |
| FS$_4$ | 1 | 0 | 0 | 1 | 0 | 2 |
| FS$_2$ | 1 | 0 | 0 | 0 | 0 | 1 | b) Systematically/iteratively discard the sets or combinations of sources that require a higher number of fulfillment sources than the number estimated in step 2 (i.e., the minimum number of fulfillment sources that can fulfill all (or the maximum number) of the products).

Next, the process evaluates the combinatorial search space. The process picks the first fulfillment source from the set previously sorted and combines it with one or more other fulfillment sources. The search tree enables the process to determine all of the possible combinations with $S_{minimum}$ elements; this is accomplished by iteratively searching depth-first for combinations with $S_{target}$ elements, until either all such combinations have been identified, or a combination with fewer elements is found, in which case the target value is reduced and the search continues through the reduced tree. The search process is weighted towards locations with higher cardinality, as these are more likely to offer solutions.

Example:

| Combinations of 2 ($S_{minimum}$) Fulfillment Sources | A | B | C | D | F | Cardinality |
|---|---|---|---|---|---|---|
| $FS_3 \mid FS_5$ | 1 | 0 | 1 | 1 | 1 | 4 |
| $FS_3 \mid FS_1$ | 1 | 0 | 1 | 0 | 1 | 3 |
| $FS_3 \mid FS_4$ | 1 | 0 | 1 | 1 | 1 | 4 |
| $FS_3 \mid FS_2$ | 1 | 0 | 1 | 0 | 1 | 3 |

Finally, the process determines all of the combinations of $S_{minimum}$ that can fulfill $P_{fulfillable}$:

Example:

| Combinations of 2 ($S_{minimum}$) Fulfillment Sources | A | B | C | D | F | Cardinality | |
|---|---|---|---|---|---|---|---|
| $FS_3 \mid FS_5$ | 1 | 0 | 1 | 1 | 1 | 4 | $=P_{fulfillable}=$ Optimal |
| $FS_3 \mid FS_1$ | 1 | 0 | 1 | 0 | 1 | 3 | |
| $FS_3 \mid FS_4$ | 1 | 0 | 1 | 1 | 1 | 4 | $=P_{fulfillable}=$ Optimal |
| $FS_3 \mid FS_2$ | 1 | 0 | 1 | 0 | 1 | 3 | |

In this example, the optimal possible combinations are therefore:

$FS_3$ combined with $FS_5$; or
$FS_3$ combined with $FS_4$.

Note that if relevant to the specific use case, one or more criteria (such as rules, factors, limits, thresholds, constraints, etc.) may be applied in order to determine which of the resulting combinations should be used to fulfill the order. For example, some merchants may prefer to select a combination of fulfillment sources that are closer to the final destination of the order, or that have a lower total cost to fulfill. In a situation where a merchant is interested in selecting a combination of sources that are closer to the destination address, each fulfillment source may be weighted by a value representing the total distance in miles from the fulfillment source location to the final delivery address.

Using the previous example, the two possible combinations are $FS_3 \mid FS_5$ and $FS_3 \mid FS_4$. The following table shows example data describing the total distance from each fulfillment source to the final destination (note that fulfillment sources that are not used in the final combinations are not shown):

| Fulfillment Sources | Miles from final destination |
|---|---|
| $FS_3$ | 80 |
| $FS_4$ | 75 |
| $FS_4$ | 215 |
| Combinations | |
| $FS_3 \mid FS_5$ | 295 |
| $FS_3 \mid FS_4$ | 155 |

Once the optimal combination is identified/selected, it may be necessary to decide which source is to provide which product(s); this may require a decision process that generates a mapping between each product to be fulfilled and a source that will provide it. Each product needs to be assigned to a specific source and each source needs to be assigned to one or more specific products. This decision process can be viewed as a search or allocation problem and may be guided by a suitable heuristic, an example of which is the following:

using the preference criteria referenced in the previous step, allocate the most-preferable source to all of the products that can be fulfilled from that source, allocate the next-most-preferable source to the remaining products that the source can fulfil, continue until all products in the order have been assigned to a specific source.

Figure 4A:
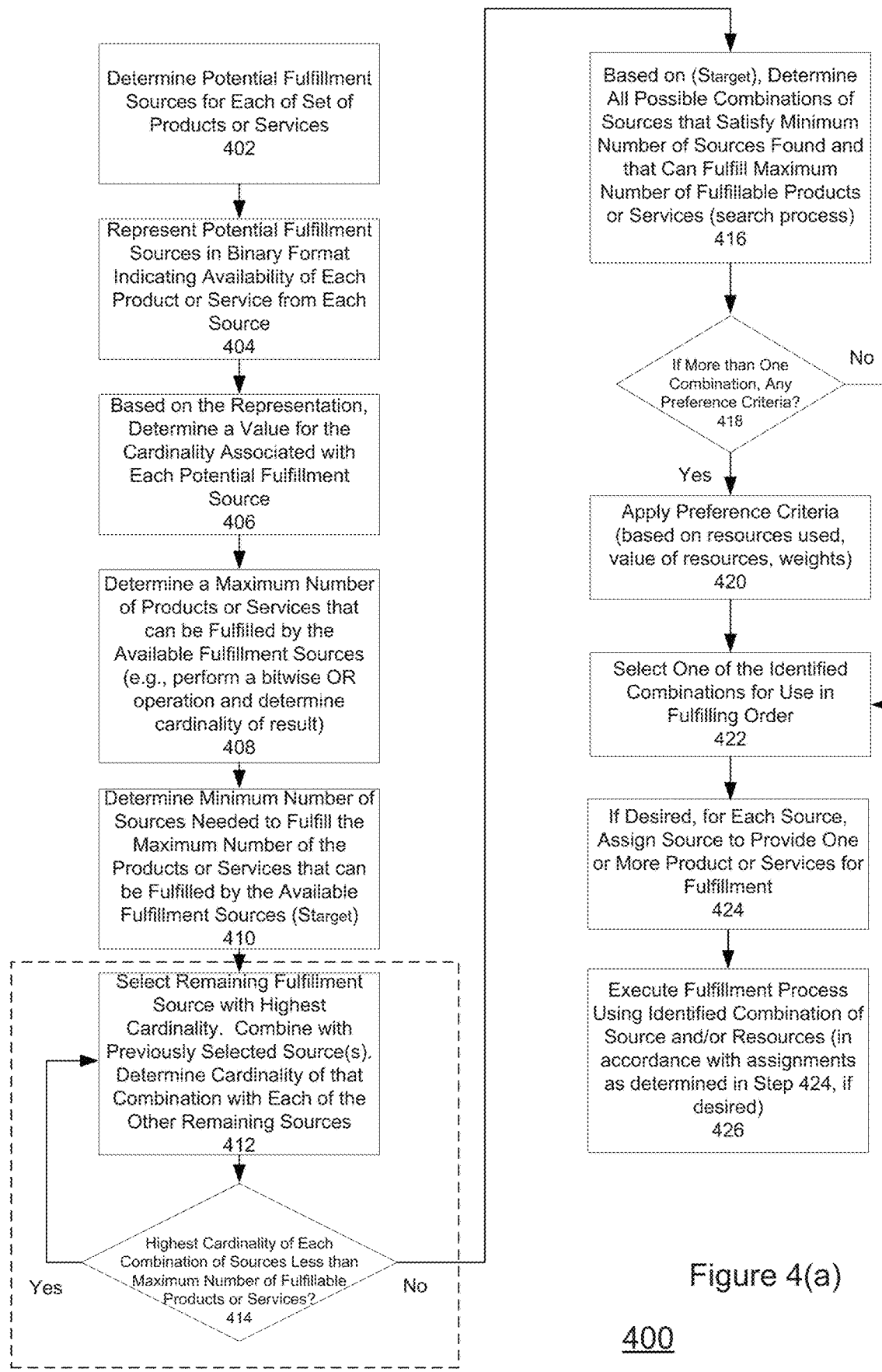
FIG. 4($a$) is a flow chart or flow diagram illustrating a process, method, operation, or function for determining an optimal set of sources and/or resources to utilize in fulfilling an order, and that may be used when implementing an embodiment of the invention.
Figure 4B:
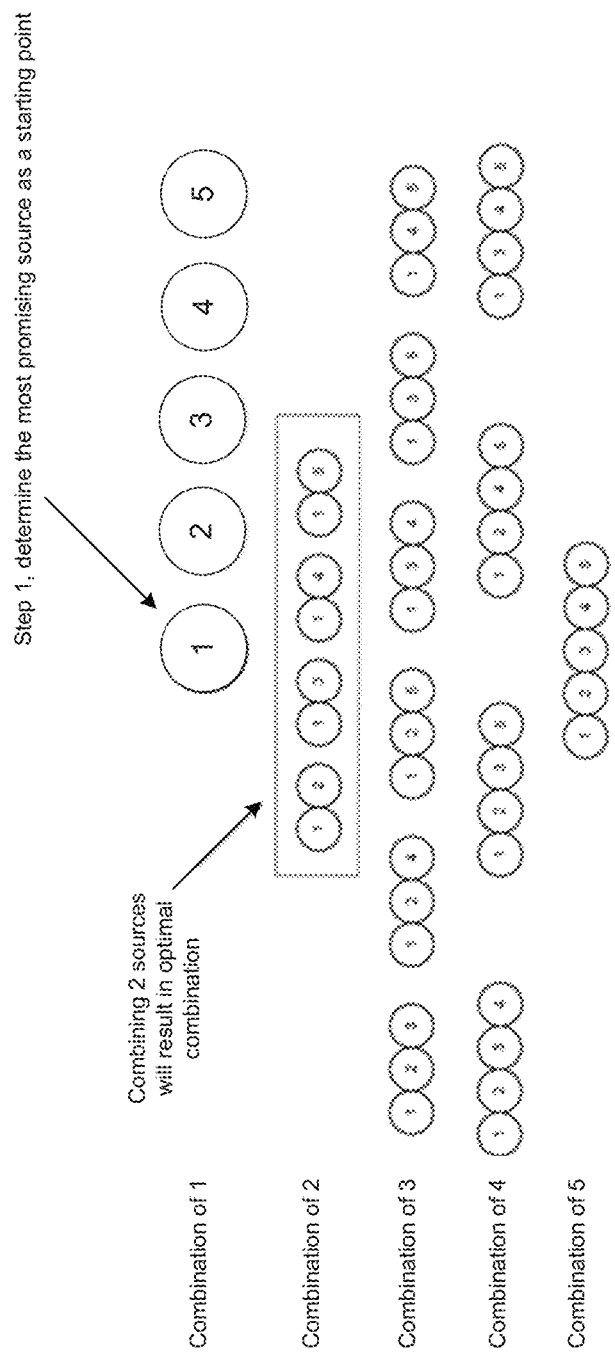

FIG. 4(a) is a flow chart or flow diagram illustrating a process, method, operation, or function for determining an optimal set of sources and/or resources to utilize in fulfilling an order 400, and that may be used when implementing an embodiment of the invention. FIG. 4(b) is a diagram illustrating a process, method, operation, or function for determining an optimal set of sources and/or resources to utilize in fulfilling an order, and that may be used when implementing an embodiment of the invention; the figure illustrates an example of a process for combining 2 elements from a set of 5 possible fulfillment sources (or resources) in order to determine which of the set of sources to use for purposes of fulfilling an order for products and/or services.

Note that by applying the proposed process steps, the set of possible combinations is reduced significantly and the optimal combination is readily identified.

As shown in FIG. 4(a), in one embodiment, the inventive process or method may be implemented by determining possible or potential fulfillment sources for each of a set of products or services (as suggested by step or stage 402); these may be locations (warehouses, physical stores, etc.) at which a particular product is known to be available (based on inventory records, for example), is expected to be available within a certain time (as it is in transit and confirmed for delivery), or is otherwise considered to be a reliable source of the product with the timeframe it is needed.

Next, the method represents the availability of each product with respect to each source by a binary number; the value of the binary number ("0" or "1") indicates whether a particular product is available from a specific source (as suggested by step or stage 404). Note that in the binary format and as shown in the matrix/table below, the placement of the value in a string relates to the specific item or product being considered, while the value itself ("0" or "1") indicates the availability of the item from a specific source:

| Fulfillment Source | A | B | C | D | F | Cardinality |
|---|---|---|---|---|---|---|
| $FS_1$ | 1 | 0 | 0 | 0 | 1 | 2 |
| $FS_2$ | 1 | 0 | 0 | 0 | 0 | 1 |
| ... | | | | | | |

Next, the method determines a value of the cardinality associated with each potential fulfillment source (i.e., the cardinality of the string representing the availability of each product or item from a specific source, as shown by a row in the table), as suggested by step or stage 406. Next, the method determines a maximum number of potentially fulfillable products or items using the available fulfillment sources. In some embodiments, this is determined by performing a bitwise OR operation on the multiple strings of binary values, and determining the cardinality of the result (as suggested by step or stage 408).

Next, the process makes an initial approximation for the value of the minimum number of the available sources that are needed to fulfill the maximum number of fulfillable products or services; this quantity is indicated as $S_{target}$ in the figure (as suggested by step or stage 410); note that this value is used to reduce the search-space in subsequent steps, and may be refined/revised as the search proceeds. The initial approximation or estimation portion of the process is indicated by the dotted-line box around steps or stages 412 and 414, which represent a process for determining an initial value of $S_{target}$ and therefore are an example implementation of step or stage 410. The sequence of steps forms an iterative process or routine for determining $S_{target}$, and can be used to provide a constraint on certain of the remaining steps or stages of the overall resource allocation process.

As shown in the dotted-line box, determining the initial value of $S_{target}$ (as suggested by step or stage 410) may be performed by an iterative process that includes (a) selecting a remaining unselected fulfillment source that has the highest value of cardinality, (b) combining that source with the one or more previously selected sources, (c) determining the cardinality of the resulting combination(s) (as suggested by step or stage 412), and (d) performing a comparison of the determined cardinality value with the previously determined maximum number of fulfillable products or services (as suggested by step or stage 414). This set of steps or stages provides an efficient way to eliminate possible combinations of sources from further consideration (e.g., those that exceed the determined value of $S_{target}$).

After determining the initial value of $S_{target}$, the process next generates one or more possible combinations of the available fulfillment sources that satisfy the requirement of using $S_{target}$ or fewer sources, and that can fulfill the maximum number of fulfillable products or services (as suggested by step or stage 416). This generation of combinations may be implemented as a depth-first search, with the pruning of all branches below where max depth (i.e., $S_{target}$ depth) is reached. If during this search a combination is found that can fulfill the maximum number of fulfillable products or services using less than $S_{target}$ sources, then previous combinations can be disqualified/discarded, and this new minimum can be taken as the new target for the rest of the process (that is, unless or until another even-smaller source count is later found). The output of this step is a set of combinations of sources that can fulfill the maximum number of fulfillable products or services, using the smallest number of sources.

By this stage, the process has identified one or more combinations of sources and/or resources that satisfy the specified criteria (e.g., satisfy $S_{target}$, and are capable of fulfilling the maximum number of products or services). Next, if desired, additional preference criteria may be applied to assist in making a final selection of the desired combination of sources and/or resources (as suggested by steps or stages 418 and 420). Examples of applicable preference criteria may include unit fulfillment cost, distance from shipping destination, equitable work distribution across sources, and overstock levels.

Application of preference criteria permits the inventive process to determine combinations of the available fulfillment sources that satisfy additional specific requirements or conditions, where some may depend on dynamic or time-changing factors. As noted, such factors may depend, for example, on the state of certain sources or resources, the value of certain business operation parameters (sales velocity, inventory, in-transit shipments), fuel costs, shipping costs, internal or external scheduling factors or events, etc.

Based on the search results and application of any desired criteria, one of the possible combinations is then selected for use in fulfilling the order (as suggested by step or stage 422). The fulfillment process is then executed, based on the use of the selected combination as the sources for fulfillment (as suggested by step or stage 426). Note that this involves assigning a source to be used for fulfillment each of the products or services to be fulfilled. This may be implemented by an allocation rule, heuristic, or criteria, as suggested by step or stage 424.

For example, given an optimal set of sources to be used for fulfillment, the process suggested by step 424 assigns a source to fulfill each of the products to be fulfilled. In some embodiments, this may be performed using the preference criteria referenced and used in previous step/stage 420 in the diagram (or other relevant criteria). As one example, the process may assign the most-preferable source to all of the lines/products that can be fulfilled from that source, then assign the next-most-preferable source to the remaining lines/products that the source can fulfill, etc. This final mapping of sources-to-products is then provided to the relevant internal processes or operations to be used in fulfilling the order (as suggested by step or stage 426).

A graphical example of the process described with reference to step or stage 416 of FIG. 4(a) is shown in FIG. 4(b). In the process shown in FIG. 4(b), the first step or stage noted is that of determining the most likely or promising source for fulfilling the desired set of products and/or services. This becomes a starting node for a "search" process which is implemented by the inventive methods. The desired result of the search is to find a set or group of sources (or, as will be explained in greater detail, resources) to utilize to fulfill an order or request for a set of products and/or services. This involves using the described methods to more optimally search a network representing the possible combinations of sources that can fulfill the order or request.

In some embodiments, the initial node or starting node for the search process may be found by selecting the one with the highest cardinality (the one that can fulfill the largest proportion of the products). Next, the source representing the starting point is combined with the next-most-promising nodes/sources (by consideration of cardinality values), and again with another, until the combination can fulfil the maximum number of fulfillable products or services, or the combination meets the $S_{target}$ number of sources (max depth reached). When max depth is reached, other less-promising choices are checked. In the illustration, most of the combinations need never be checked, as they involve more than $S_{target}$ sources.

Note that FIG. 4(b) illustrates a simplified version of the overall process; the diagram could be made more complex/comprehensive to illustrate other possible optimizations in the process, such as revising the $S_{target}$ value during the process (and thereby discarding previous candidate combinations), the direction/strategy employed to perform the search (depth-first), that at every branch the next source to be considered is the "most promising" by cardinality, etc.

The proposed process reduces the number of possible combinations to be considered by applying data transformations and optimizations in the search space. Therefore, determining the optimal fulfillment sources/resources can be accomplished in relatively less computational processing and overall time (e.g., a few milliseconds). In some embodiments, the inventive process/method transforms the information about fulfillment sources and products into binary representations and computes combinations of binary numbers with no order and no repetition until it reaches the combination with the minimum number of fulfillment sources that can fulfill all (or the maximum number of) the products. In addition, the process/method applies optimizations that prune the combinatorial search space.

In one sense, embodiments of the invention implement a solution to the analogous mathematical problem of pruning a very large search tree relatively quickly in order to provide a solution to a specific business problem in a specific manner. Embodiments of the inventive system and methods provide a practical solution to a resource allocation problem involving the fulfillment of an order or orders that contain multiple items. This may involve consideration of delivery channels and mechanisms, warehouse sources for an item, inventory in transit, etc. The solution provided by the inventive system and methods is determined by and includes aspects of the problem being solved, and relates to determining a specific way to fulfill an order or orders.

Embodiments of the inventive system and methods assist in identifying an optimal set of sources and/or resources to use in fulfilling an order, and may be implemented in a manner that takes into account relevant operating factors, business status, etc. As noted, from one perspective, an embodiment of the invention provides an optimized search method for searching a tree representation of a network of sources and/or resources; this approach may be used for other purposes in addition to order fulfillment. Such other purposes may include the sourcing of deliverable products from suppliers, the planning of internal stock transfers between fulfillment locations, and broader resource-allocation scenarios, such as corporate training schedule planning.

Note further that, as mentioned, an embodiment of the invention may be implemented in a manner that relies on operational data regarding a business as a factor or factors that control or modify the search process and/or the filtering of combinations, and ultimately impacts the source combination selected for use in fulfilling an order. This enables the invention to respond to the operational status of a business (or changes to that status) when selecting a desired combination, where the operational status may be reflected by ERP, CRM, eCommerce, financial, or other data. As a result, real-time or pseudo real-time values of operational metrics may be used to alter the preferences or filters applied to potential combinations of sources or resources; this permits embodiments of the invention to perform a dynamic assignment of sources for order fulfillment based on business logic or real-time conditions within an organization (in order to shift inventory, make optimal use of warehouses, limit transportation costs, minimize delivery time, etc.).

As noted, in some embodiments, the invention may be implemented in the context of a multi-tenant, "cloud" based environment (such as a multi-tenant business data processing platform), typically used to develop and provide (Internet)web-based services and business applications for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to host or serve as an execution environment for one or more software services/applications intended to serve the needs of the users of other computers in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
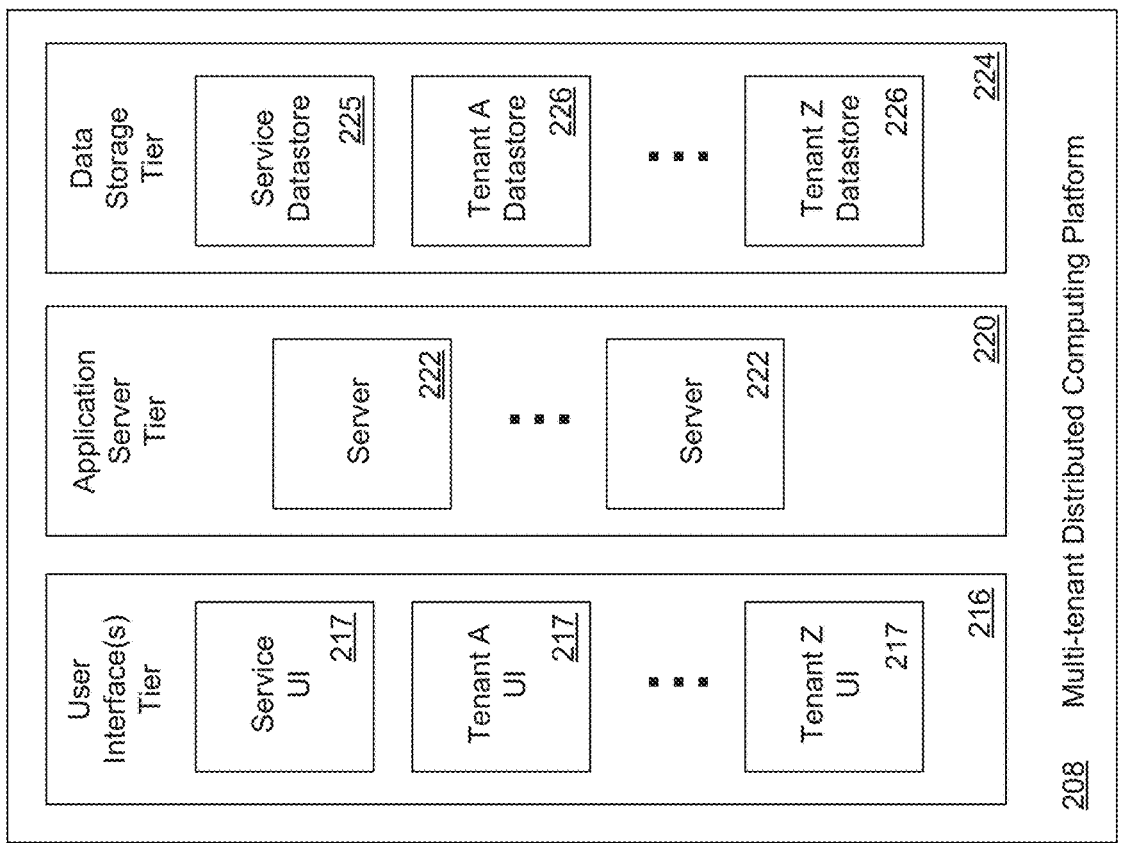
FIG. 2 is a diagram illustrating elements or components of an example operating environment in which an embodiment of the invention may be implemented.
Figure 2:
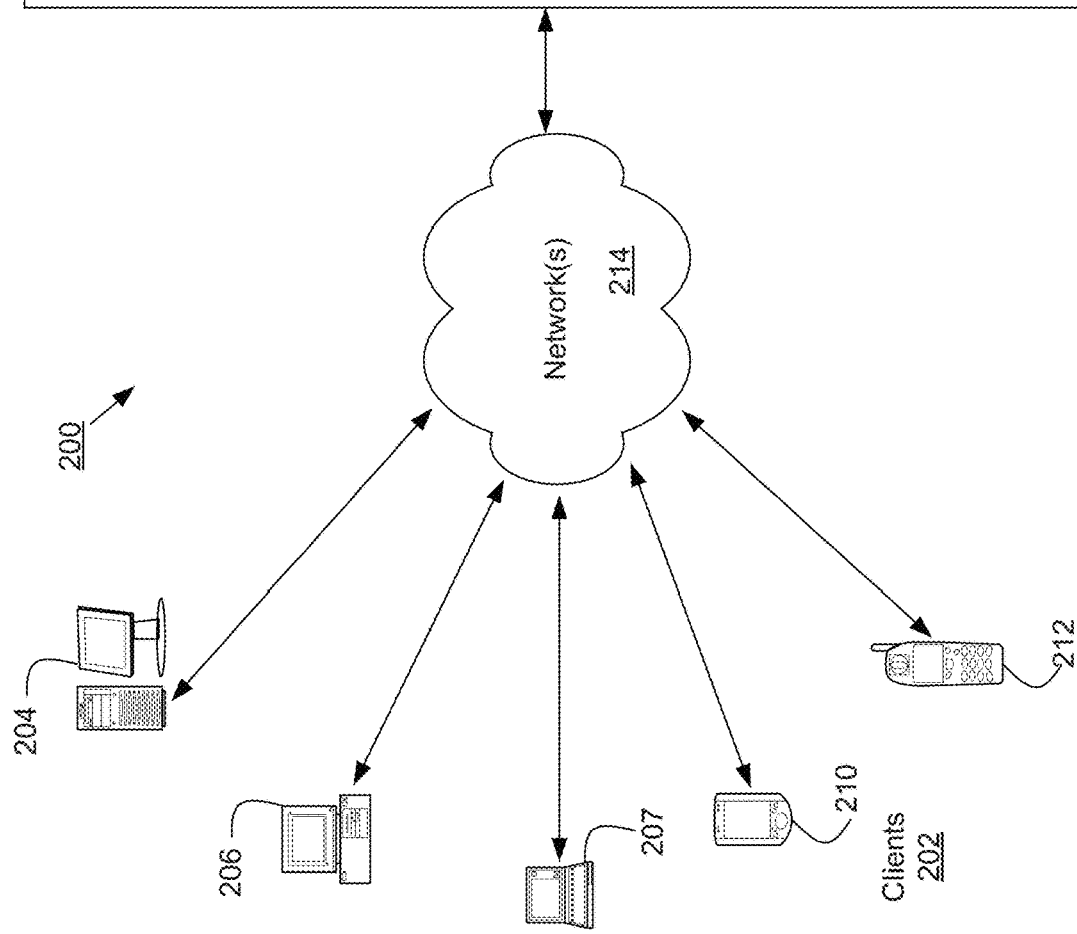

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to host or serve as an execution environment for one or more software services/applications intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases such an extension may be applied to the processing of the tenant's business related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases the developer may prefer to make the upgrade available to only a select set of users (at least initially) in order to obtain feedback for improving the newer version of the extension, to test the stability of the extension, or to assist them to segment the market for their extension(s).

Figure 3:
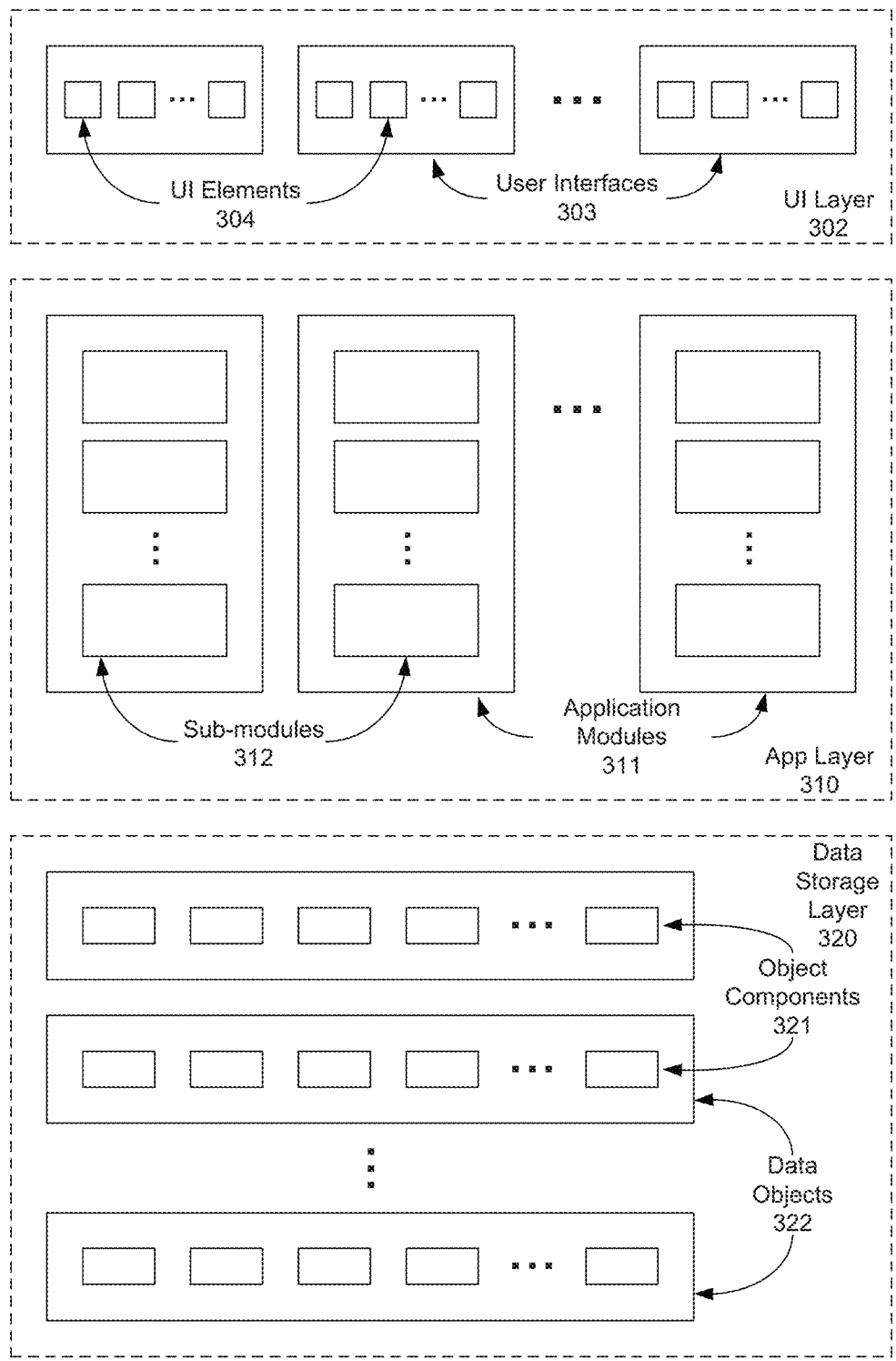
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. As described herein, embodiments of the invention provide a method for configuring aspects of a user interface (such as the data entry fields of a form) by specifying one or more user interface elements to present to a specified user.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as:

Determine the availability of each of the items in terms of the sources that can provide each of the items or services;

Represent the availability as a binary value in a cell of a matrix, with a value of "1" indicating that an item or service (i) is available from source (j); thus, in this case the value in cell (ij) is "1";

Determine the cardinality of each potential fulfillment source;

Determine the maximum number of fulfillable products or services that can be fulfilled by the available sources;

Determine the minimum number of sources required to provide the maximum number of fulfillable products, $S_{target}$;

Determine one or more combinations of sources that represent the minimum number of sources required to provide the maximum number of fulfillable products;

If more than one combination is determined as representing the minimum number of sources required to provide the maximum number of fulfillable products, select a combination for use in fulfilling the order based on application of one or more rules, criteria, preferences, heuristics, weights, relative value or cost, etc.; and Proceed to execute the fulfillment process for the order using the selected combination (this may involve further decision processes, such as that suggested by step 424 of FIG. 4(a)).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although the example implementation environments may reference the computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

Figure 5:
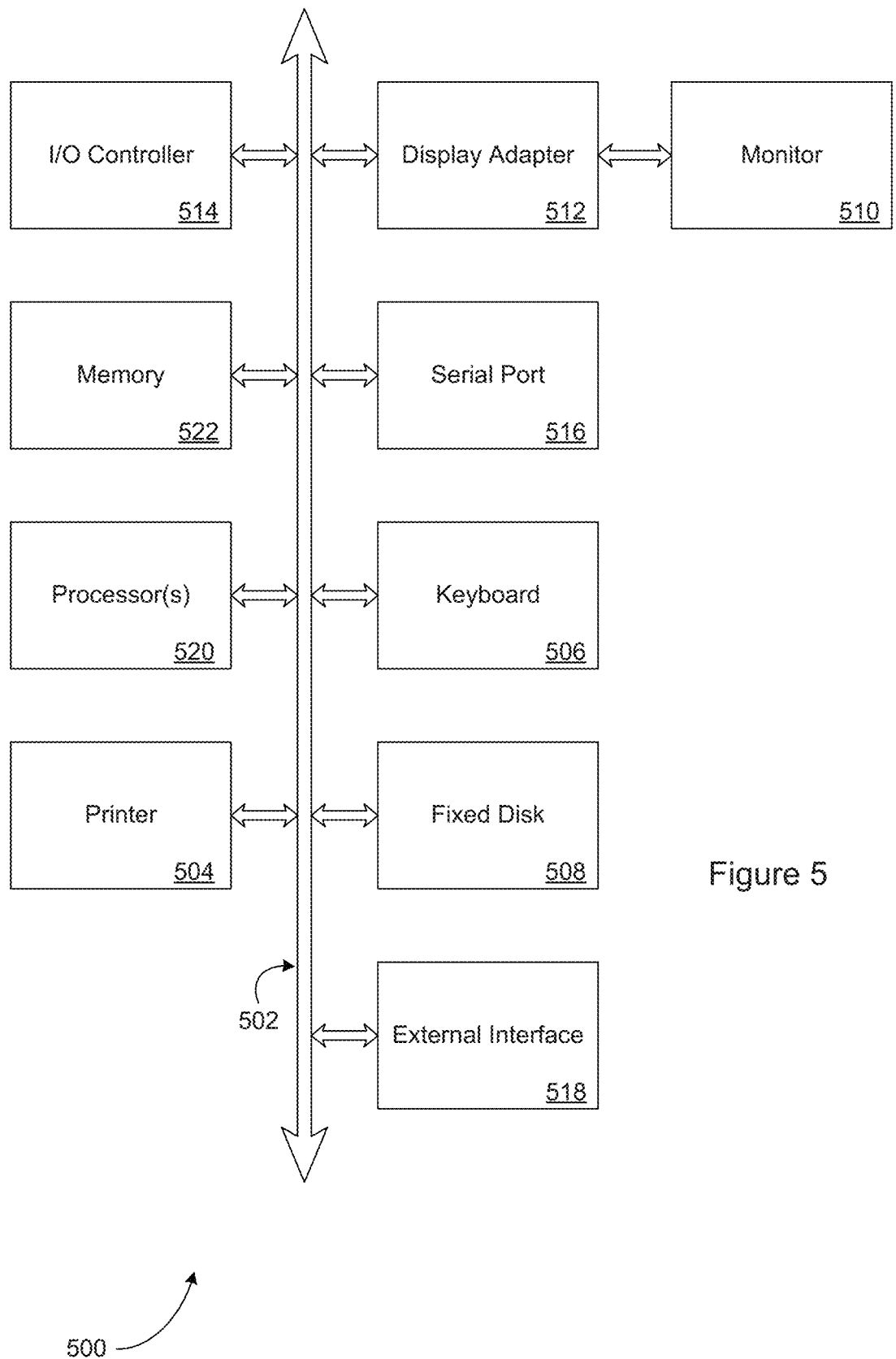
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for determining an optimal set of sources or resources to utilize to fulfill an order may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method of fulfilling an order for a plurality of items by a computing system including at least one processor executing instructions stored in a memory, comprising:
    accessing data representing the order by the processor accessing the memory, the accessed data including information sufficient to determine either zero, one, or more than one source from which each of the plurality of items may currently be obtained;
    for each of the plurality of items for which one or more sources may provide the item, determining an assignment of each of the plurality of items to a source for purposes of fulfillment, wherein determining the assignment is executed by at least the processor and further comprises:
        representing an availability of each of the plurality of items in relation to a specific source as a binary number in the memory, wherein a first value of the binary number indicates that the item is available from that source and a second value indicates that the item is not available from that source;
        generating a binary representation for each source that includes each of the binary numbers for each of the items;
        determining a cardinality value for each of the one or more sources based on a sum of the first values of the binary number indicating that the item is available from that source;
        determining a maximum number of the plurality of items that can be fulfilled by the sources by performing a bitwise OR operation among the binary representations of the one or more sources to generate a resulting bit string, and determining a cardinality of the resulting bit string which is set as the maximum number of the plurality of items that can be fulfilled by the sources;
        determining a minimum number of sources required to fulfill the maximum number of the plurality of items that can be fulfilled by the sources based at least in part on the cardinality of the resulting bit string from each of the sources;
        pruning a combinatorial search space of possible combinations of sources by discarding combinations of sources that require a greater number of sources than the minimum number of sources determined to fulfill the maximum number of the plurality of items;
        determining, from the pruned combinatorial search space, one or more combinations of sources that satisfy the minimum number of sources required to fulfill the maximum number of the plurality of items that can be fulfilled by the sources;
        wherein determining the one or more combinations of sources that satisfy the minimum number of sources required to fulfill the maximum number of the plurality of items that can be fulfilled by the sources further comprises performing a search process;
        wherein the search process further comprises a depth first search using the determined minimum number of sources required to fulfill the maximum number of the plurality of items that can be fulfilled by the sources as a control factor in the search process;
        wherein determining a minimum number of sources required to fulfill the maximum number of the plurality of items that can be fulfilled by the sources further comprises:
            (a) selecting a remaining unselected fulfillment source that has a highest value of cardinality;
            (b) combining that source with the one or more previously selected sources;
            (c) determining the cardinality of the resulting combinations; and
            (d) performing a comparison of the determined cardinality value with the previously determined maximum number of items that can be fulfilled; and
        wherein if there are zero sources from which one of the plurality of items may currently be obtained, then the method further comprises determining if the item will be available within a certain time period;
        if more than one combination of sources is determined to satisfy the minimum number of sources required to fulfill the maximum number of the plurality of items that can be fulfilled by the sources, then applying one or more preference criteria to determine one combination of sources to use for fulfilling the order;
        for each source in the determined one combination of sources, assigning each item to a specific source and each source to one or more specific items; and
        executing the fulfillment process using the assigned sources and their associated item or items.

2. The method of claim 1, wherein determining a minimum number of sources required to fulfill the maximum number of the plurality of items that can be fulfilled by the sources further comprises
    (a) selecting a remaining unselected fulfillment source that has the highest value of cardinality;
    (b) combining that source with the one or more previously selected sources;
    (c) determining the cardinality of the resulting combination(s); and
    (d) performing a comparison of the determined cardinality value with the previously determined maximum number of items that can be fulfilled.

3. The method of claim 1, wherein if there are zero sources from which one of the plurality of items may currently be obtained, then the method further comprises determining if the item will be available within a certain time period.

4. The method of claim 1, wherein the preference criteria include one or more of unit fulfillment cost, distance from shipping destination, an equitable work distribution across sources, or overstock levels.

5. The method of claim 1, wherein assigning each item to a specific source and each source to one or more specific items further comprises assigning the most-preferable source to all of the items that can be fulfilled from that source, then assigning the next-most-preferable source to the remaining items that the source can fulfill, and continuing in that manner until items in the order have been assigned to a source for fulfillment.

6. An apparatus for fulfilling an order for a plurality of items, comprising:
    a database or data store containing a plurality of records, the plurality of records including records corresponding to the order;

a processor programmed with a set of instructions, wherein when executed by the processor, the instructions cause the apparatus to access the data records representing the order, the accessed data including information to determine either zero, one, or more than one source from which each of the plurality of items may currently be obtained;

for each of the plurality of items for which one, or more than one, source may provide the item, determining an assignment of each of the plurality of items to a source for purposes of fulfillment, wherein determining the assignment is executed by at least the processor and further comprises:

representing an availability of each of the plurality of items in relation to a specific source as a binary number, wherein a first value of the binary number indicates that the item is available from that source and a second value indicates that the item is not available from that source;

generating a binary representation for each source that includes each of the binary numbers for each of the items;

determining a cardinality value for each of the one or more sources based on a sum of the first values of the binary number indicating that the item is available from that source;

determining a maximum number of the plurality of items that can be fulfilled by the sources by performing a bitwise OR operation among the binary representations of the one or more sources to generate a resulting bit string, and determining a cardinality of the resulting bit string which is set as the maximum number of the plurality of items that can be fulfilled by the sources;

determining a minimum number of sources required to fulfill the maximum number of the plurality of items that can be fulfilled by the sources based at least in part on the cardinality of the resulting bit string from each of the sources;

pruning a combinatorial search space of possible combinations of sources by discarding combinations of sources that require a greater number of sources than the minimum number of sources determined to fulfill the maximum number of the plurality of items;

determining, from the pruned combinatorial search space, one or more combinations of sources that satisfy the minimum number of sources required to fulfill the maximum number of the plurality of items that can be fulfilled by the sources;

wherein determining the one or more combinations of sources that satisfy the minimum number of sources required to fulfill the maximum number of the plurality of items that can be fulfilled by the sources further comprises performing a search process;

wherein the search process further comprises a depth first search using the determined minimum number of sources required to fulfill the maximum number of the plurality of items that can be fulfilled by the sources as a control factor in the search process;

wherein determining a minimum number of sources required to fulfill the maximum number of the plurality of items that can be fulfilled by the sources further comprises:

(a) selecting a remaining unselected fulfillment source that has a highest value of cardinality;

(b) combining that source with the one or more previously selected sources;

(c) determining the cardinality of the resulting combinations; and (d) performing a comparison of the determined cardinality value with the previously determined maximum number of items that can be fulfilled; and wherein if there are zero sources from which one of the plurality of items may currently be obtained, then the method further comprises determining if the item will be available within a certain time period;

if more than one combination of sources is determined to satisfy the minimum number of sources required to fulfill the maximum number of the plurality of items that can be fulfilled by the sources, then applying one or more preference criteria to determine one combination of sources to use for fulfilling the order;

for each source in the determined one combination of sources, assigning each item to a specific source and each source to one or more specific items; and execute the fulfillment process using the assigned sources and their associated item or items.

7. The apparatus of claim 6, wherein the preference criteria include one or more of unit fulfillment cost, distance from shipping destination, an equitable work distribution across sources, or overstock levels.

8. The apparatus of claim 6, wherein assigning each item to a specific source and each source to one or more specific items further comprises assigning the most-preferable source to all of the items that can be fulfilled from that source, then assigning the next-most-preferable source to the remaining items that the source can fulfill, and continuing in that manner until items in the order have been assigned to a source for fulfillment.

9. A non-transitory computer-readable medium comprising stored computer-executable instructions that when executed by a processor of a computer causes the processor to at least:

access data records representing the order, the accessed data including information to determine either zero, one, or more than one source from which each of a plurality of items may currently be obtained;

for each of the plurality of items for which one, or more than one, source may provide the item, determining an assignment of each of the plurality of items to a source for purposes of fulfillment, wherein determining the assignment is executed by at least the processor and further comprises:

representing an availability of each of the plurality of items in relation to a specific source as a binary number, wherein a first value of the binary number indicates that the item is available from that source and a second value indicates that the item is not available from that source;

generating a binary representation for each source that includes each of the binary numbers for each of the items;

determining a cardinality value for each of the one or more sources based on a sum of the first values of the binary number indicating that the item is available from that source;

determining a maximum number of the plurality of items that can be fulfilled by the sources by performing a bitwise OR operation among the binary representations of the one or more sources to generate a resulting bit string, and determining a cardinality of the resulting bit string which is set as the maximum number of the plurality of items that can be fulfilled by the sources;

determining a minimum number of sources required to fulfill the maximum number of the plurality of items that can be fulfilled by the sources based at least in part on the cardinality of the resulting bit string from each of the sources;

pruning a combinatorial search space of possible combinations of sources by discarding combinations of sources that require a greater number of sources than the minimum number of sources determined to fulfill the maximum number of the plurality of items;

determining, from the pruned combinatorial search space, one or more combinations of sources that satisfy the minimum number of sources required to fulfill the maximum number of the plurality of items that can be fulfilled by the sources;

wherein determining the one or more combinations of sources that satisfy the minimum number of sources required to fulfill the maximum number of the plurality of items that can be fulfilled by the sources further comprises performing a search process;

wherein the search process further comprises a depth first search using the determined minimum number of sources required to fulfill the maximum number of the plurality of items that can be fulfilled by the sources as a control factor in the search process;

wherein determining a minimum number of sources required to fulfill the maximum number of the plurality of items that can be fulfilled by the sources further comprises:
  (a) selecting a remaining unselected fulfillment source that has a highest value of cardinality;
  (b) combining that source with the one or more previously selected sources;
  (c) determining the cardinality of the resulting combinations; and
  (d) performing a comparison of the determined cardinality value with the previously determined maximum number of items that can be fulfilled; and wherein if there are zero sources from which one of the plurality of items may currently be obtained, then the method further comprises determining if the item will be available within a certain time period;

if more than one combination of sources is determined to satisfy the minimum number of sources required to fulfill the maximum number of the plurality of items that can be fulfilled by the sources, then applying one or more preference criteria to determine one combination of sources to use for fulfilling the order;

for each source in the determined one combination of sources, assigning each item to a specific source and each source to one or more specific items; and execute the fulfillment process using the assigned sources and their associated item or items.

* * * * *